(12) United States Patent
Nurenberg et al.

(10) Patent No.: US 6,397,255 B1
(45) Date of Patent: May 28, 2002

(54) METHOD AND APPARATUS FOR PROVIDING INTELLIGENT NETWORK SERVICES

(75) Inventors: Steven Howard Nurenberg, Manalapan; David Hilton Shur, Aberdeen; Aleksandr Zelezniak, Matawan, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/219,397

(22) Filed: Dec. 23, 1998

(51) Int. Cl.[7] .............................................. G06F 15/16
(52) U.S. Cl. ....................................... 709/228; 709/238
(58) Field of Search ................................. 709/226, 229, 709/238–242, 227, 228

(56) References Cited

U.S. PATENT DOCUMENTS

| | | | | |
|---|---|---|---|---|
| 6,006,268 A | * | 12/1999 | Coile et al. .................. | 709/227 |
| 6,035,334 A | * | 3/2000 | Martin et al. ................ | 709/228 |
| 6,098,108 A | * | 8/2000 | Sridhar et al. ............... | 709/239 |
| 6,119,161 A | * | 9/2000 | Lita et al. .................... | 709/227 |
| 6,138,162 A | * | 10/2000 | Pistriotto et al. ............ | 709/229 |
| 6,185,598 B1 | * | 2/2001 | Farber et al. ................ | 709/239 |
| 6,240,461 B1 | * | 5/2001 | Cieslak et al. .............. | 709/235 |
| 6,327,622 B1 | * | 12/2001 | Jindal et al. ................ | 709/228 |

* cited by examiner

Primary Examiner—Patrice Winder

(57) ABSTRACT

Proposed is a system and method for providing Intelligent Network services. In one embodiment, the system of the present invention includes a database interacting with a socket redirector installed on a client computer. In one method implemented using the system of the present invention, a socket redirector intercepts a standard Internet Protocol (IP) socket call from a client software application and identifies parameters within the socket call. If the redirector is able to determine that the identified parameters are addressed to the most appropriate socket for accommodating the software application's request, the IP socket call is sent to network software where the socket call is used to form packets which are sent over the network to the requested socket. If the redirector is unable to determine that the identified parameters are addressed to the most appropriate socket for accommodating the request, the redirector requests instructions from a database. The socket redirector then modifies the IP socket call parameters using the instructions received from the database and sends the modified IP socket calls to network software for processing as described above.

24 Claims, 4 Drawing Sheets

METHOD AND APPARATUS FOR PROVIDING INTELLIGENT NETWORK SERVICES

BACKGROUND

The present invention is directed to providing network computing services. More particularly, the present invention provides a general mechanism for enabling Intelligent Network services.

The power of personal computers has increased exponentially over the past several years. This increase in personal computer power is partially due to advances in central processing units (CPU's) which manage the flow of information within personal computers. Each new generation of CPU's is able to process more instructions per unit time than the previous generation. The number and types of services available to a personal computer user has increased in proportion to the increased speed of CPU's.

In addition to the development of faster CPU's, connecting computers together in networks has also increased the number and types of services which are available to personal computer users. A network may be defined as a connected group of computers which allows users to share information. Additional services become available to personal computer users when networks of computers are connected to each other.

A computer connected to one network may exchange data with a computer connected to another network by encapsulating data into packets and transmitting the packets along wired or wireless connections between the networks. Currently, many wired networks are connected through nodes, such as routers, which perform the basic task of forwarding packets to destination networks. Sometimes nodes perform a limited amount of processing on received packets, but current nodes lack the ability to act intelligently. Intelligent activity in a computer network increases the number and types of services which are available to network (end system) computers. Intelligent Network services add value to communication between end system computers and other computers by analyzing requests for network services and altering these requests, if necessary, to ensure the most efficient use of network resources.

A socket redirector is a known layer of software which may redirect data from one socket to another socket and is therefore a partially enabling mechanism for Intelligent Network services. A socket is a known data structure which may be used to create a communication channel for transmitting information among network computers and their application programs. Support of sockets is usually provided with a computer operating system (e.g., Windows 95/NT or UNIX). Although sockets may be associated with a variety of communication protocols, we will focus on the Internet Protocol (IP) in the remainder of this document.

As mentioned, application programs on network computers may communicate using sockets. A socket call is a procedure executed by an application program to create or use a socket. When an application program creates a socket to send information to another application program, that socket is identified with a destination address and port number. For example, some application programs on network servers support Internet Web sites. Typically, an Internet user uses a networked computer running an application program (such as a Web browser) to interact with Internet Web sites. To establish a connection between the Web site application program running on the server and the Web browser application program running on the Internet user's computer, each application program first creates a socket. Each created socket is identified with an address and port number. Next, the Web browser application program sends a connection request across the Internet to the Web site application program. This connection request includes the address and port number of the socket which corresponds to the desired Web site. The connection request also includes the source (Web browser) address and port number. Once the two application programs have exchanged the addresses and port numbers for the sockets each will use, the two application programs may exchange packets of data through the identified sockets. Various socket types exist including so-called datagram sockets, where connection requests are not a necessary precursor to direct communication.

In a client/server computer network, a socket redirector may be installed on the client and/or the server. The socket redirector intercepts socket calls before these requests are sent to the network layer of the local computer. The socket redirector may modify various parameters included within an intercepted socket call if the appropriate information is provided to the socket redirector. The socket redirector may use this information to modify the socket call in order to redirect a client request to a "better" source than the originally requested source.

Unfortunately current socket redirector arrangements are unable to support Intelligent Network services by allowing users to establish communication between end system computers and other computers while receiving added value to the communication from highly specialized and reliable database systems.

In view of the above, it can be appreciated that there is a need for a system which enables Intelligent Network services.

SUMMARY OF THE INVENTION

The present invention provides a general mechanism for enabling Intelligent Network services. A system according to an embodiment of the present invention includes a socket redirector on a client computer interacting with a remote database. Examples of Intelligent Network services enabled by this socket redirector arrangement include the following: 1) improved socket call routing between an application program executed by the redirector equipped computer and an application program executed by another computer, 2) improved multicast to unicast address translation, and 3) the establishment of "800 telephone number" type services for the Internet.

DETAILED DESCRIPTION

One embodiment of a system according to the present invention enables Intelligent Network services through the arrangement of three known elements: 1) socket redirector software installed on an end system (client or server)

computer, 2) a database of information concerning end system computer communication, and 3) a communication mechanism which enables the database to remotely control the socket redirector software installed on the end system computer. The system of the present invention enables Intelligent Network services by allowing the database to add value to communication between the end system computer and other computers. In addition, controlling the socket redirector remotely (for example, from within the network to which the end system computer is connected) rather than controlling the socket redirector locally on the end system computer itself allows end system computer users to obtain the benefit of highly specialized and reliable database systems without the end system computer users having to own and manage these database systems. This benefit is similar to the benefit enjoyed by telephone users and businesses who use "800" telephone numbers because the systems that provide and enable 800 telephone calls are provided by and managed by telephone carrier networks.

Figure 1:
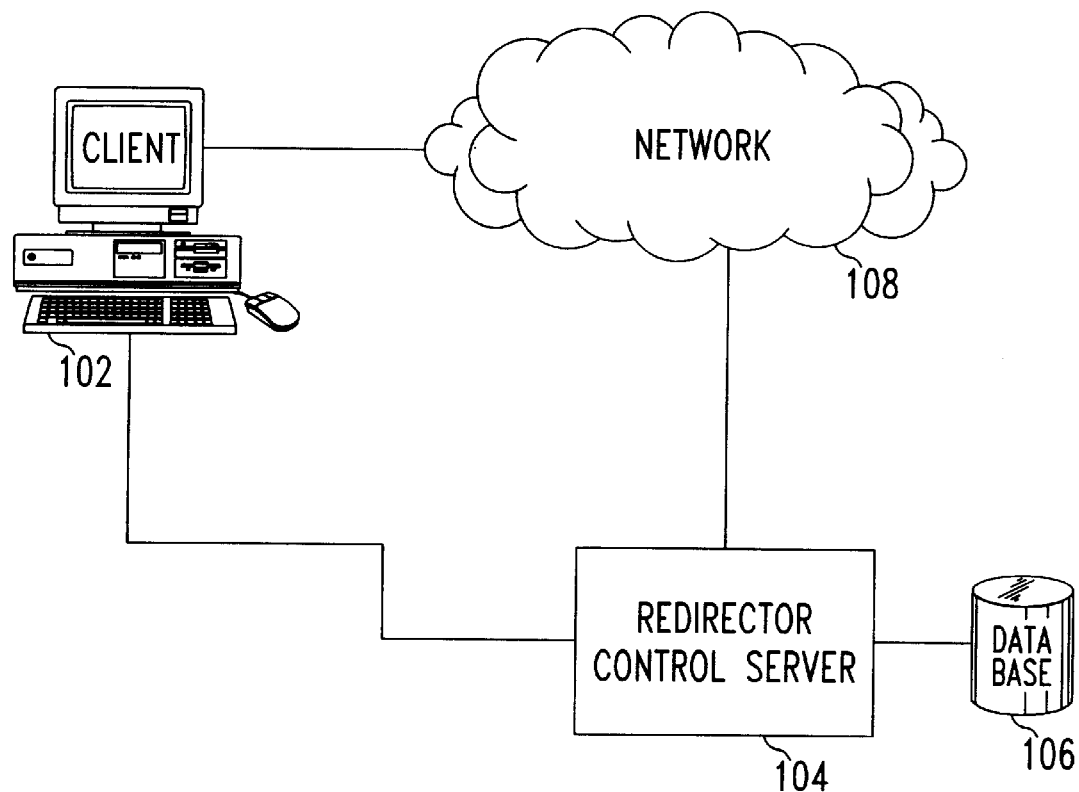
FIG. 1 is a block diagram of a system suitable for practicing an embodiment of the present invention.

FIG. 1 is a block diagram of a system suitable for practicing an embodiment of the present invention. In FIG. 1, a client computer 102 is adapted to communicate with a redirector control server 104. The communication mechanism between client computer 102 and redirector control server 104 may be based, for example, on the known transmission control protocol/Internet protocol (TCP/IP) standard. A database 106 is connected to redirector control server 104. Both client 102 and redirector control server 104 are connected to a network 108. Network 108 may be, for example, a local area network (LAN) connected to one or more other networks (such as the Internet) not shown in FIG. 1.

Figure 2:
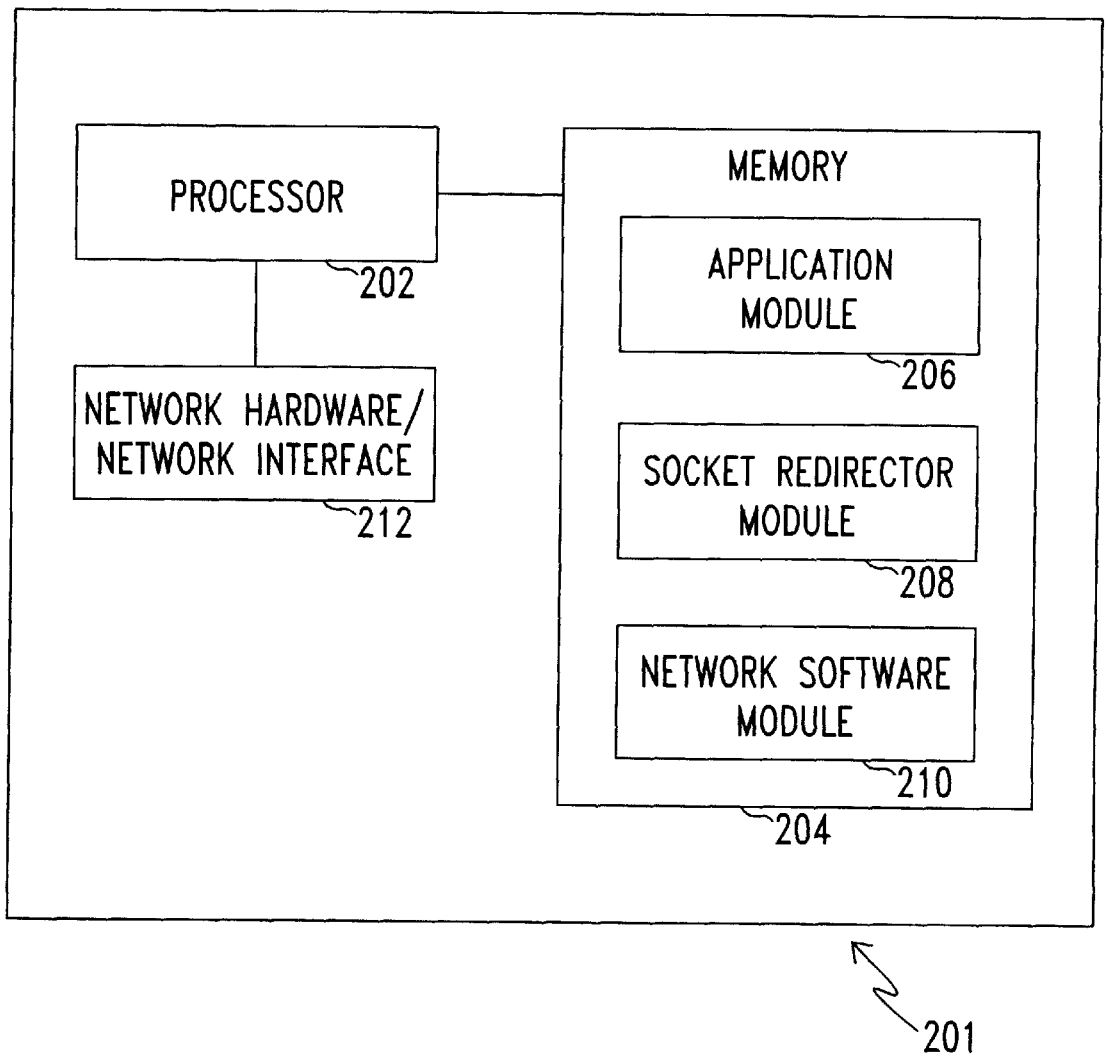
FIG. 2 is a block diagram of a client computer in accordance with one embodiment of the present invention.

FIG. 2 is a block diagram of a client computer in accordance with one embodiment of the present invention. In FIG. 2, a client computer 201 comprises a processor 202 connected to a computer readable memory 204, and a network hardware/network interface 212. Memory 204 stores computer program code segments which, when executed by processor 202 implement the main functionality of this embodiment of the invention. These segments are separated into three modules: (1) an application module 206, (2) a socket redirector module 208, and (3) a network software module 210. Although in this embodiment of the invention, the computer program segments are shown as three separate modules, it can be appreciated that these modules can be further separated into more modules or combined together to form a single module, and still fall within the scope of the invention.

Application module 206 may include computer program segments for a software application which enables client 201 to interact with software applications on computers in the same or in other networks. Examples of these software applications include Internet Web browsing software such as Navigator by Netscape which enables the client to interact with software applications on the World Wide Web (WWW) and Internet Protocol (IP) multicast audio and video players.

The method of the present invention will now be explained with reference to FIG. 1 and FIG. 2. In one embodiment of the invention, software application module 206 generates an IP socket call in a known manner and sends the IP socket call to network software module 210. Each IP socket call may include one or more of the following network and transport parameters: a source address, a destination address, a source port number, a destination port number, and a protocol type. The generated IP socket call may be, for example, a request to "read" from a particular site on the WWW. Socket redirector module 208 intercepts the IP socket call generated by application module 206 prior to the IP socket call reaching network software module 210.

Socket redirector 208 may include, for example, computer program. segments which analyze each intercepted IP socket call. to identify the presence of one or more predetermined parameters selected by the user or the presence of parameters socket redirector 208 does not recognize (i.e., is unable to process). The user may predetermine that socket calls directed toward certain sockets should always be redirected to another socket. If none of the predetermined parameters are present and all the identified parameters are recognized, socket redirector module 208 sends the IP socket call to network software module 210. Network software module 210 creates one or more packets using the received, IP socket call and sends the packet(s) to network 108 via processor 202 and network hardware/network interface 212. The formed packets may comply, for example, with TCP/IP standards.

If socket redirector module 208 identifies one or more predetermined parameters within the IP socket call or does not recognize all the identified parameters, socket redirector module 208 sends a request for instructions to redirector control server 104. Redirector control server 104 will send socket redirector module 208 instructions for modifying one or more parameters within the intercepted IP socket call. These modification instructions may include, for example, an alternative address and port number for a socket which is more appropriate for accommodating the "read" request originated from application module 206. Upon receiving the requested instructions from redirector control server 104, socket redirector module 208 uses the instructions to modify the IP socket call parameter(s). After socket redirector module 208 has modified the IP socket call parameters, socket redirector module 208 sends the modified IP socket call to network software module 210.

To minimize the number of times socket redirector module 208 must request instructions, from redirector control server 104, socket redirector module 208 stores or caches (for a predetermined period of time) instructions previously received from the server for use in modifying subsequently intercepted IP socket calls which include identical predetermined parameter(s). Upon receiving the modified IP socket call from socket redirector module 208, network software module 210 creates one or more packets based on the modified IP socket call and sends the packet to network 108 as described above.

In another embodiment of the invention, redirector control server 104 may provide socket redirector module 208 with instructions on how to await the receipt of data. In yet another embodiment of the invention, redirector control server 104 may provide instructions to a specific network server to send data to client 102 on an. address and port number supplied to the specific network server by redirector control server 104.

An embodiment of the present invention may also be implemented to provide multicast to unicast address translation. Multicast to unicast address translation is a technique which allows unicast users to access multicast information. In general terms, addresses are included within packets to ensure the packet's payload is properly routed to the intended endpoint. A multicast address within a packet enables a packet to be received by multiple endpoints (here, the term endpoint is used in reference to an application program residing on a particular client computer). In contrast, a packet including a unicast address is intended to be received by one particular endpoint. Multicast communication is well-suited and highly efficient for group communication, including broadcasting. However, multicast capable systems are unable to communicate with non-multicast capable systems unless the addresses within their respective packets are translated.

Most current networks are not multicast enabled. Thus, individual endpoints connected to such networks are unable to receive information included within multicast packets unless the addresses are translated. Multicast to unicast address translation is the process of rewriting the address field of a packet from a multicast form of the address to a unicast form of the address and vice versa. The drawbacks of the current translation methods (which typically accomplish translation using the application program executed on the client) may be eliminated by accomplishing translation using redirector software executed on the client computer. For example, upon receiving a request from application module 206 to receive data from a multicast capable system, socket redirector module 208 may send a message to redirector control server 104 indicating the requested multicast system. Redirector control server 104 then sends a message to a Multicast-Unicast Gateway (MUG) (not shown). The message from redirector control server 104 includes instructions for accomplishing the multicast to unicast translation for the two-way stream of packets between application module 206 and: the multicast capable system. The MUG then receives the multicast data from the multicast system, translates the multicast data to unicast data, and sends the unicast data to socket redirector 208 which forwards the unicast data to application module 206. Data from application module 206 to the multicast system would follow the above steps in the reverse order. In this manner, translation is accomplished without tying up the limited resources within an application program such as application module 206. This embodiment may also conserve limited client computer storage resources by storing multicast server socket data on redirector control server 104 or on database 106.

In yet another example, the system of the present invention may be implemented to provide "800 telephone number" type services for the Internet. Unlike a caller using conventional telephone numbers, a caller who uses the "800 telephone number" service is not required to keep track of changes in the actual telephone number assigned to an intended party. Unknown to the caller, the telephone system automatically translates the 800 number dialed by the caller to the actual telephone number where the intended party may be reached.

Thus, so long as the "800 telephone number" service is updated with the intended party's actual telephone number, the caller may reach the intended party using the 800 number assigned to the intended party and the caller is not required to keep track of changes in the intended party's actual telephone number.

Currently, the Internet extensively uses a domain name system (DNS) to map a logical address to a routable address. A routable address is one understood by network routers (network devices which forward packets from their source to their intended destination address). Packets with logical addresses cannot be directly routed to a particular endpoint because network routers are unable to process logical addresses. Packets with routable addresses may be directly routed to their endpoints because current network routers support the necessary protocol infrastructure. Thus, logical addresses within packets must be translated or "mapped" to routable addresses to ensure these packets are properly routed to their endpoints.

The advantages of using logical addresses over routable addresses to send packets to particular destinations are similar to the advantages of using "800 telephone number" service over conventional telephone numbers. A network user may use a logical address to route a packet to an intended endpoint without knowing the actual routable address assigned to the intended endpoint so long as the logical address can be effectively mapped to the proper routable address. The current DNS mapping system hinders the development of "800 telephone number" type services for networks because mappings are cached (stored) in local DNS servers or possibly in client applications. This arrangement makes a rapid or by-time-of-day address mapping extremely difficult.

The system of the present invention may be implemented to provide "800 telephone number" type services for the Internet by providing the infrastructure for remapping all IP header parameters, such as the address field, the port identifier (ID), and the protocol type. One important special case consists of mapping logical addresses to routable addresses. When a socket call is made in which header parameters are received from the application program, the socket redirector module 208 may query a redirector control server 104 for instructions for remapping the header parameters. For example, socket redirector module 208 may use the received instructions to map a logical IP address to a routable IP address. Packets including the routable address may then be accommodated by current network routers which support the protocol infrastructure for routing packets including routable addresses.

Figure 3:
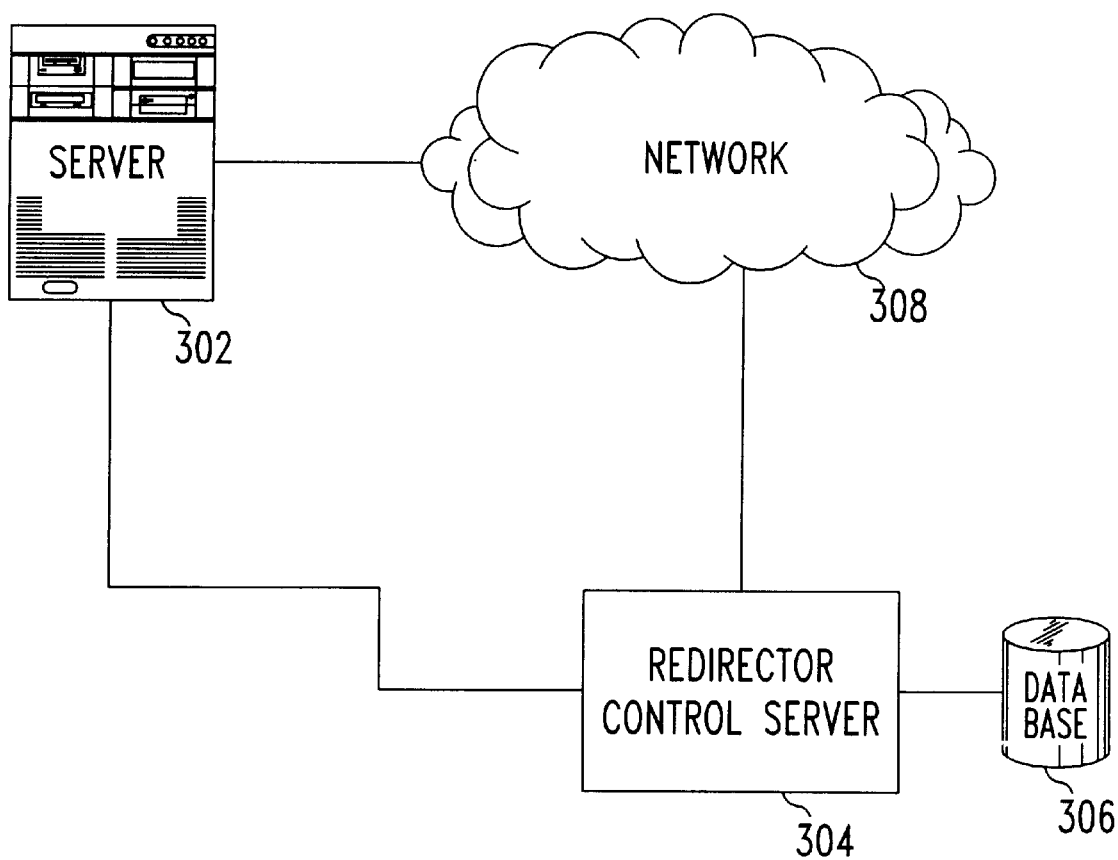
FIG. 3 is a block diagram of a system suitable for practicing another embodiment of the present invention.

In another embodiment of the present invention, the system described above with reference to FIG. 1 may be implemented using redirector software included within a server rather than a client computer. FIG. 3 is a block diagram of a system suitable for practicing another embodiment of the present invention. In FIG. 3, a server 302 is connected to a network 308. Server 302 is a general purpose computer which includes a processor, a network hardware/network interface, and redirector software within a computer-readable memory as described with reference to client 201 in FIG. 2. Network 308 may be, for example, a wide area network (WAN). A redirector control server 304 is connected to network 308 and server 302. A database 306 is connected to redirector control server 304.

Figure 4:
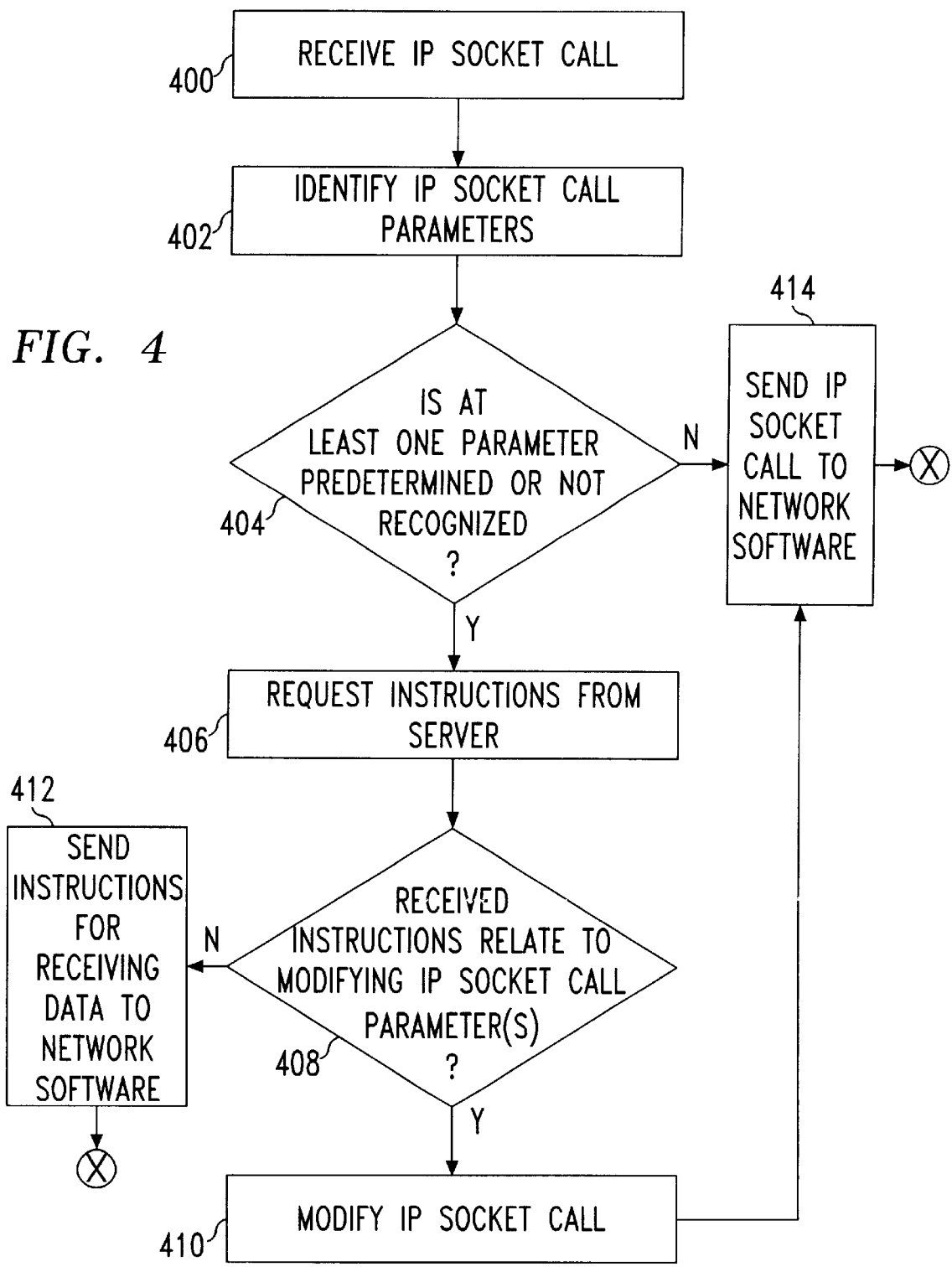
FIG. 4 illustrates an example of a flow chart with steps for creating a communication channel between a client computer and a network computer in accordance with one embodiment of the present invention.

FIG. 4 illustrates an example of a flow chart with steps for creating a communication channel between a client computer and a network computer in accordance with one embodiment of the present invention. These steps may be implemented, for example, as a computer program or as computer hardware using well-known signal processing techniques. If implemented in software, the computer program instructions are stored in machine readable memory, such as Read-Only Memory (ROM), Random Access Memory (RAM), magnetic disk (e.g., 3.5" diskette or hard drive), optical disk (e.g., CD-ROM) and so forth. The computer program instructions are executed using a processor using well known techniques. The computer hardware or software implementing the various embodiments of the invention may be located, for example, within a client computer or a server.

In step 400, the socket redirector software receives an IP socket call from a client software application. In step 402, the redirector software will identify parameters (such as socket addresses and port numbers) within the IP socket call. In step 404, the socket redirector determines whether at least one of the identified parameters is on a predetermined list of parameters or if at least one of the identified parameters is not recognized by the socket redirector software. If the answer to either or both of these queries is "yes", in step 406, the redirector software requests instructions for processing the IP socket call from a server (such as redirector control server 104, described above). If the answer to both of the step 404 queries is "no", in step 414, the socket redirector software sends the IP socket call to network software. In step 408, the socket redirector software will determine whether the instructions received from the server relate to modifying one or more of the IP socket call parameters. If the instructions do relate to modifying the IP socket call, the socket call is modified in step 410 and sent to network software in step 414. If the received instructions do not relate to modifying the IP socket call, the instructions may relate to identifying an address and port number for a socket through which the client will receive requested data from a second server. These instructions for receiving data are sent to client network software in step 412.

Although various embodiments are specifically illustrated and described herein, it will be appreciated that modifications and variations of the present invention are covered by the above teachings and within the purview of the appended claims without departing from the spirit and intended scope of the invention.

What is claimed is:

1. A method for connecting a client to a second network device, comprising the steps of:
   receiving a communication request at a redirector module within said client, wherein said communication request was generated by a first software application within said client, said request having at least one value, and wherein said request relates to communicating with a second network device;
   determining whether said at least one value matches a predetermined criteria;
   sending a first message to a database if said at least one value matches said predetermined criteria;
   receiving, from said database, a second message containing at least one modified value corresponding to said at least one value; and
   connecting to a second software application within said second network device using said modified value.

2. The method of claim 1, wherein said at least one value is a communication parameter.

3. The method of claim 1, further comprising the step of:
   storing said second message for use upon receiving a subsequent communication request having said at least one value.

4. The method of claim 3 wherein said communication request is an IP socket call.

5. A method for providing network services, comprising the steps of:
   intercepting a communication request that was generated by a software application within a first network device, wherein said communication request includes a parameter, and wherein said intercepting is performed at the first network device;
   determining at the first network device that the intercepted communication request meets a condition;
   sending a message from the first network device to a second network device;
   receiving, from said second network device, instructions to modify said communication request parameter; and
   causing a communication to be sent from the first network device to a destination network device based on the communication request with said modified parameter.

6. The method of claim 5, wherein the communication request is a socket call.

7. The method of claim 6, wherein said method is performed by a socket redirector module.

8. The method of claim 7, wherein the second network device is a redirector control server.

9. The method of claim 5, wherein said parameter is a destination address for the communication request, wherein said step of modifying a parameter modifies the destination address, and wherein the communication is sent to the modified destination address.

10. The method of claim 5, wherein the communication request contains a multicast address, and wherein said step of modifying a parameter comprises performing a multicast to unicast address translation.

11. The method of claim 5, wherein said modifying a parameter comprises remapping of an Internet Protocol header parameter in the communication request.

12. The method of claim 11, wherein said remapping comprises remapping a logical address to a routable address.

13. The method of claim 5, wherein the intercepted communication is determined to have met said condition whenever said parameter is not recognized by a redirector module at the first network device.

14. The method of claim 13, wherein the intercepted communication is also determined to have meet said condition whenever said parameter has a predefined value.

15. A method for providing network services, comprising the steps of:
   receiving a communication request that was generated by a software application within a client device, wherein said communication request is received by a socket redirector module within said client device;
   sending a message from the client device to a socket redirector server requesting instructions for handling the communication request;
   receiving from the socket redirector server instructions in response to said message;
   modifying a parameter within the communication request at the socket redirector module if the instructions indicate that the parameter should be so modified; and
   causing the communication request to be sent from the client to a network server.

16. The method of claim 15, wherein the communication request is a socket call.

17. The method of claim 16, wherein said method is performed by a socket redirector module.

18. The method of claim 17, wherein the second network device is a redirector control server.

19. The method of claim 15, wherein said parameter is a destination address for the communication request, wherein said step of modifying a parameter modifies the destination address, and wherein the communication is sent to the modified destination address.

20. The method of claim 15, wherein the communication request contains a multicast address, and wherein said step of modifying a parameter comprises performing a multicast to unicast address translation.

21. The method of claim 15, wherein said modifying a parameter comprises remapping of an Internet Protocol header parameter in the communication request.

22. The method of claim 21, wherein said remapping comprises remapping a logical address to a routable address.

23. The method of claim 15, wherein the intercepted communication is determined to have met said condition whenever said parameter is not recognized by a redirector module at the first network device.

24. The method of claim 15, wherein the intercepted communication is determined to have meet said condition whenever said parameter has a predefined value.

* * * * *